Oct. 22, 1935.    R. H. MOULTON    2,018,312
SHOCK ABSORBER
Filed Aug. 20, 1930    5 Sheets-Sheet 1
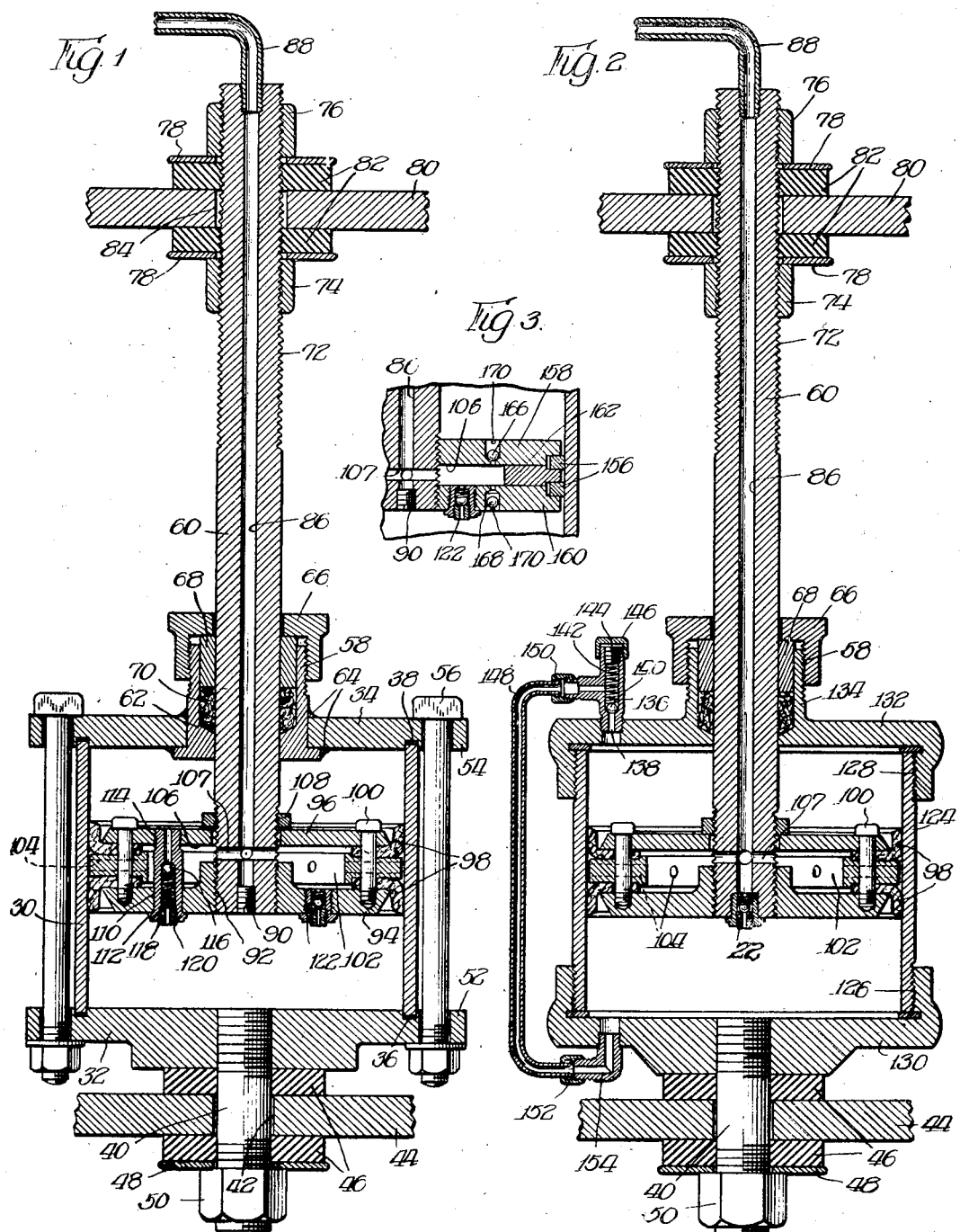

Oct. 22, 1935.  R. H. MOULTON  2,018,312
SHOCK ABSORBER
Filed Aug. 20, 1930   5 Sheets-Sheet 2
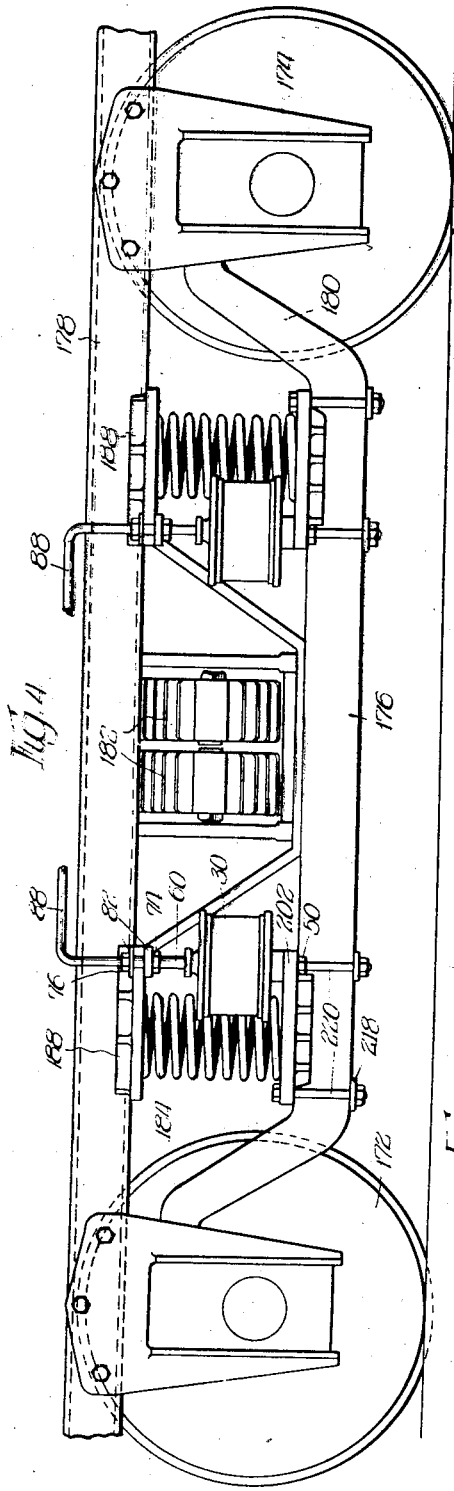
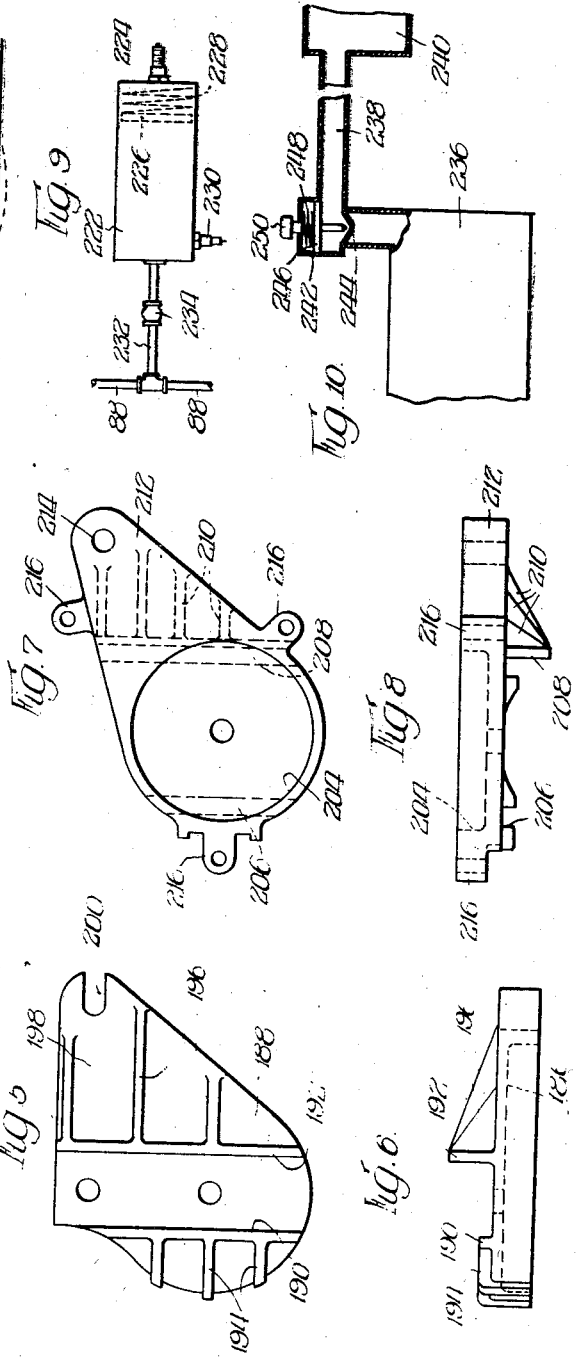
Inventor:
Rollin H Moulton,

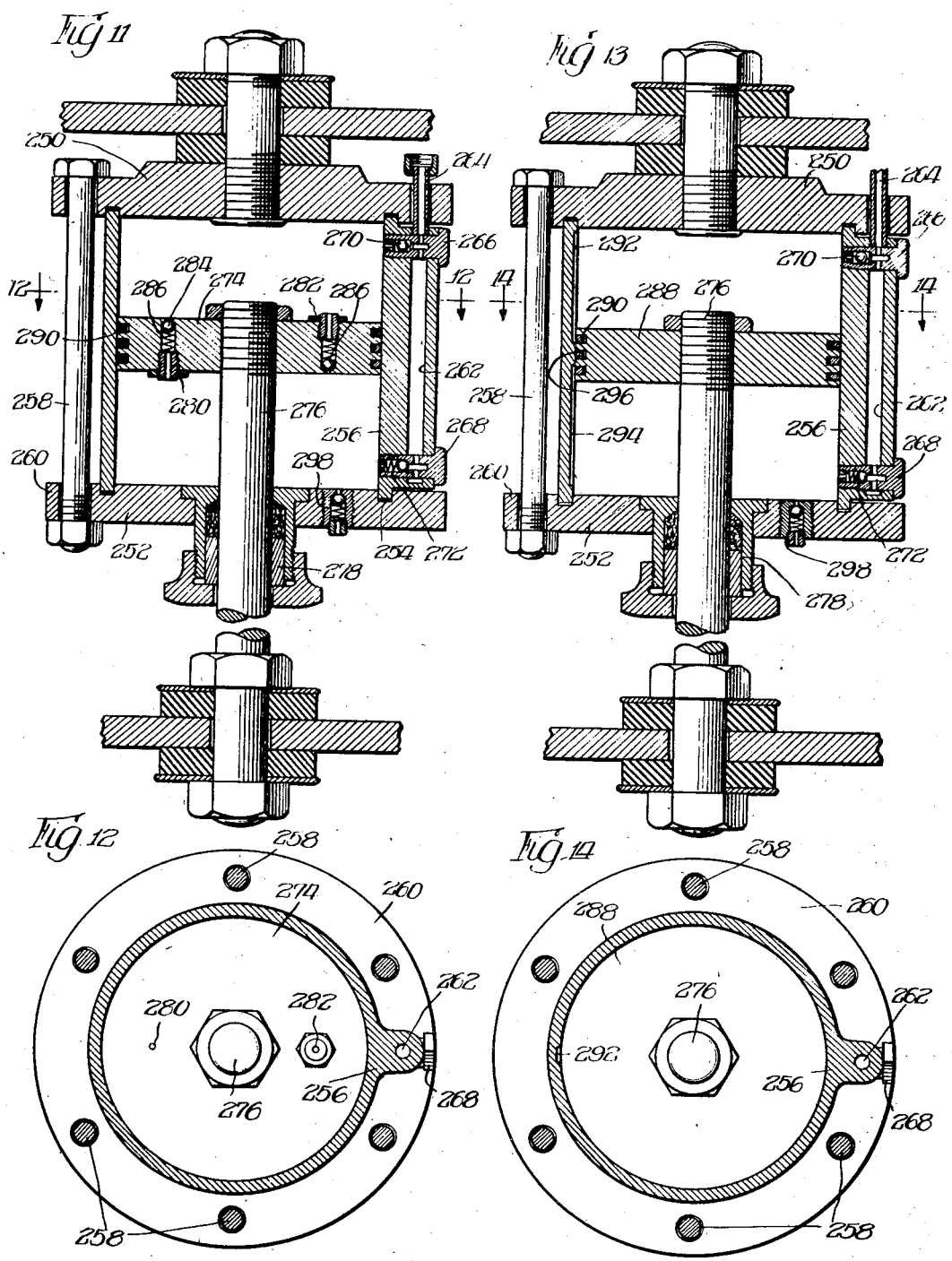

Oct. 22, 1935.  R. H. MOULTON  2,018,312
SHOCK ABSORBER
Filed Aug. 20, 1930  5 Sheets-Sheet 4
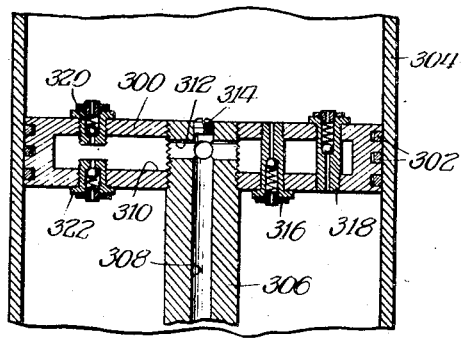
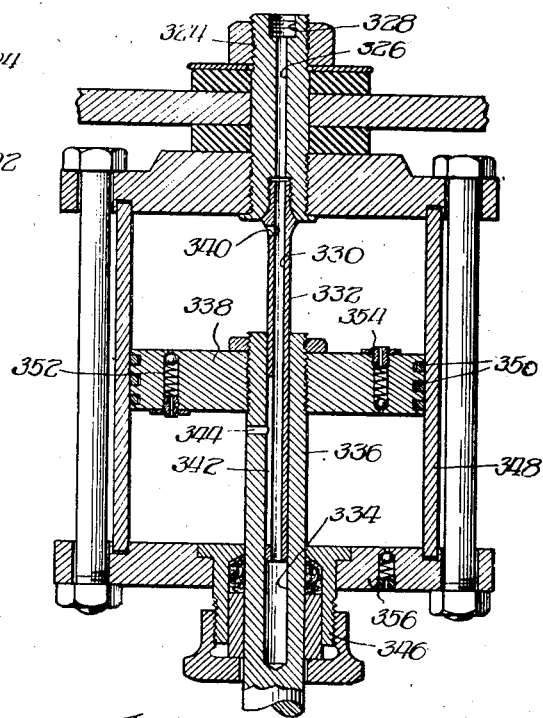
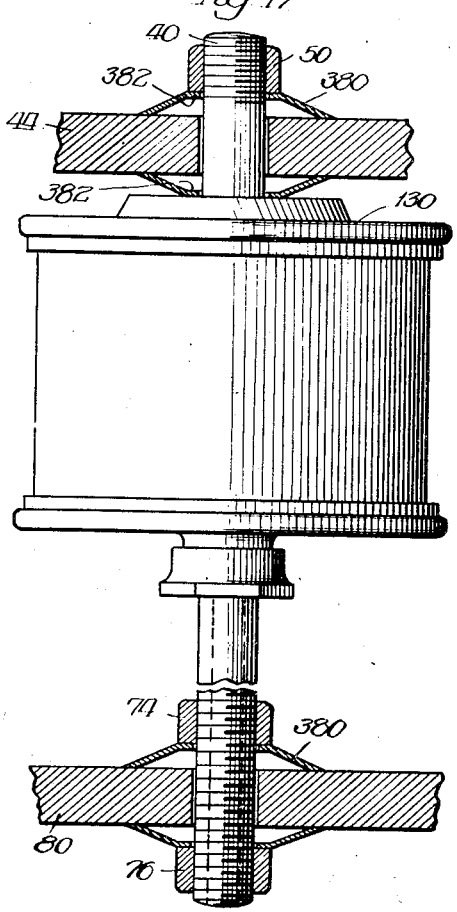
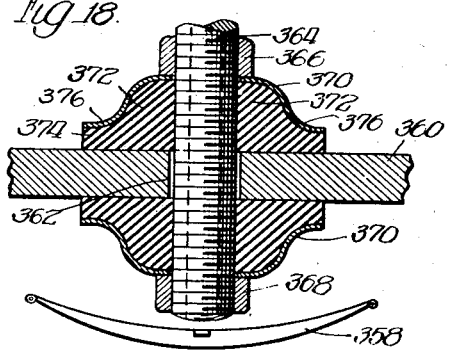
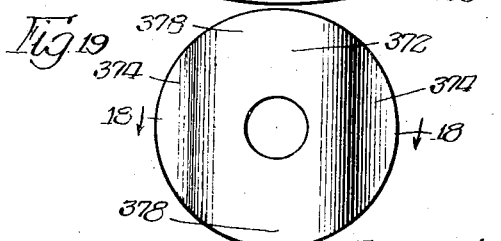
Inventor:
Rollin H Moulton,

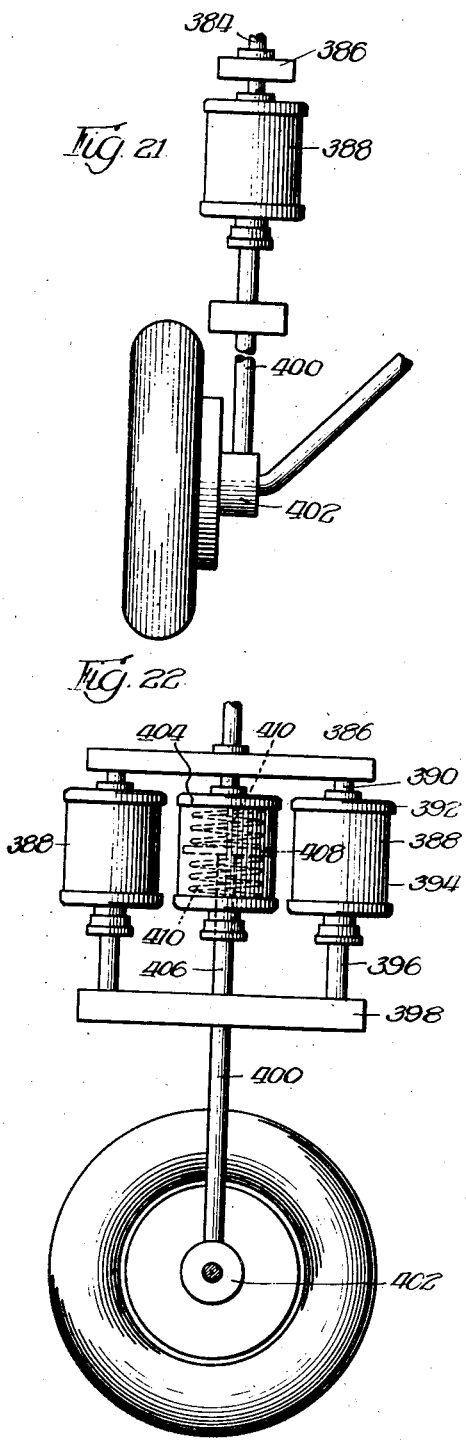
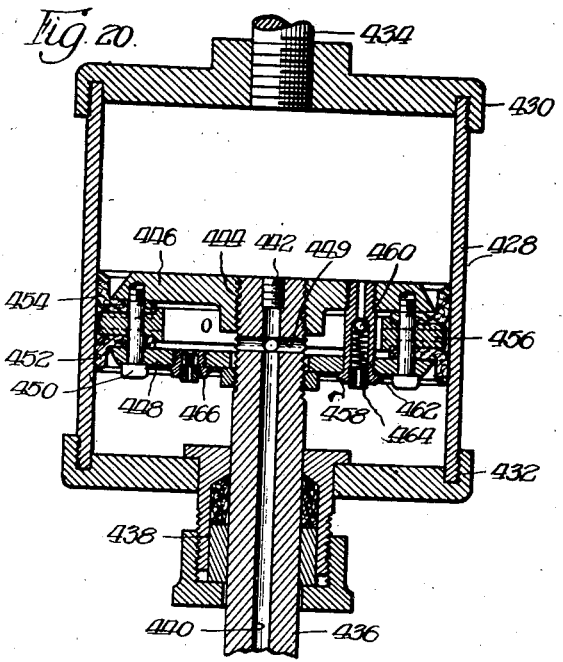

Patented Oct. 22, 1935

2,018,312

UNITED STATES PATENT OFFICE 2,018,312

SHOCK ABSORBER

Rollin H. Moulton, Berwyn, Ill.

Application August 20, 1930, Serial No. 476,590

13 Claims. (Cl. 188—88)

This invention pertains to shock absorbers or cushioning devices, and more particularly to that class of device adapted to be used on road vehicles, airplanes, track vehicles, or in fact, between any parts having relative movement therebetween where it is desired to retard or cushion the movements between said parts.

In shock absorbers now in use, there are a great many of the so-called hydraulic type. Some of the finer of this type are double acting, but at the expense of added weight and finer fitted parts, to prevent leakage and insure practical operation. This type of shock absorber is necessarily quite expensive, and in fact, the expense is such as to be almost prohibitive for cars of the cheaper type. There are other well known types of hydraulic shock absorbers which do not involve the snubbing action, or employ only the snubbing action. In other words, they are not double acting, and even with such devices, the cost is not within the price range of mechanical snubbers, though it is admitted the hydraulic shock absorbers are decidedly advantageous and desirable. Further, even the most expensive shock absorbers do not provide means for increasing the snubbing action, which is desirable, especially in heavy duty work. That is, the movement in either direction is balanced, which is oftentimes not desirable and does not meet particular needs.

In busses and the like heavy duty carriers where air brakes have been effectively used, and to properly supply compressed air to the air brakes, a compressor is run off the power plant. In such vehicles, in order to get the proper shock absorbing, the units disposed between the body and the axles or wheels must heretofore have been oversize in order to properly take care of the immense weights, and so it would be very advantageous to provide a shock absorber wherein the initial pressure is very high, and a simple way of handling this situation would be to have the shock absorber associated with the compressor.

In railway rolling stock the problem of checking side sway is a very important one, both from a standpoint of comfort to the passengers in a passenger train, and from a standpoint of power necessary to move a freight train. From a standpoint of economy in freight service, a single locomotive is used where possible to haul a great number of cars, especially where the track is laid in flat country, but side sway of the cars causes the wheel flanges to contact the side of the rail, and the friction so developed is enormous. Shock absorbing devices now in use would not be sufficient to cut down the side sway of the cars or cushion the vertical movement for the reason that the weights to be handled are too great. However, by providing a shock absorbing device wherein the initial pressure is much higher than atmospheric, this can be accomplished.

It is therefore an object of the invention to provide a cushioning device utilizing a fluid as an absorber medium.

Another object is to provide a device for effectively cushioning shocks between parts from a plurality of directions.

Yet another object is to provide a double acting checking or cushioning device using a plurality of checks in each direction of operation, and one which combines the action of a shock absorber and a snubber.

A further object is to provide a cushioning device wherein it is possible to vary the resistance to operation in either direction.

A still further object is to provide a cushioning device readily adaptable to all uses, as on road vehicles, railroad draft gear, between parts of track vehicles having relative movement, airplanes, engine or other prime or secondary movers and their beds, in fact, between any parts having relative movement, to cushion or check said parts in operation thereof.

Yet further objects are to provide a fluid cushioning device of lighter and sturdier structure than those used, one in which little wear takes place, one that is easy to manufacture and requires little or no attention once installed, one which more adequately meets service conditions, and one which is inexpensive to make and maintain and fulfills all requirements of service and manufacture.

An additional object is to provide a cushioning device wherein the initial pressure is materially higher than atmospheric.

Another additional object is to provide a cushioning device for use in heavy vehicles wherein the initial pressure of the device is controlled by the pressure of the compressor or air line carried by the vehicle and wherein the exhaust air used in the device is returned to the air line and not exhausted to the atmosphere.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a sectional elevation of a shock absorbing device embodying the invention;

Figure 2 is a sectional elevation of a modified form of shock absorbing device embodying the invention;

Figure 3 is a fragmentary sectional elevation taken through a portion of the piston and associated cylinder wall showing a modified piston arrangement;

Figure 4 is a fragmentary side elevation of a railway vehicle truck showing the application of the shock absorbing devices thereto;

Figure 5 is a top plan view of a combination bracket and spring cap for the application of the shock absorbing devices to a railway vehicle;

Figure 6 is a side elevation of the device shown in Figure 5;

Figure 7 is a top plan view of a bottom combination spring cap and bracket for the shock absorbing devices;

Figure 8 is a side elevation of the device shown in Figure 7;

Figure 9 is a plan of an air storage tank and reduction valve for use with a shock absorbing system;

Figure 10 is a fragmentary sectional elevation of a shock absorber supply tank showing connection thereof to the brake system or train line;

Figure 11 is a sectional elevation of another modified form of shock absorber device embodying the invention;

Figure 12 is a sectional elevation taken substantially in the plane as indicated by line 12—12 of Figure 11;

Figure 13 is a sectional elevation of yet another modified form of the device embodying the invention;

Figure 14 is a sectional elevation taken substantially in the line as indicated by the line 14—14 of Figure 13;

Figure 15 is a fragmentary sectional elevation through the piston rod and associated cylinder showing another modified form of piston arrangement;

Figure 16 is a sectional elevation through still another modified form of shock absorbing device embodying the invention;

Figure 17 is a sectional elevation showing a suspension connection between the shock absorber and associated brackets;

Figure 18 is a sectional elevation through a rubberized connection between the piston rod and associated spring or axle bracket for preventing axle roll, the small elliptic spring shown disposed adjacent thereto indicating the direction of connection between the rubberized connection and the spring;

Figure 19 is a top plan view of one of the rubberized members;

Figure 20 is a fragmentary sectional elevation through a further modified form of shock absorbing device;

Figure 21 is a fragmentary elevation showing the application of the shock absorbing devices to the strut of an airplane or similar vehicle;

Figure 22 is a view taken substantially at 90° to that shown in Figure 21; and

Figure 23 is a fragmentary sectional elevation through a strut of an airplane or similar vehicle showing a modified arrangement of the devices.

Referring first of all more particularly to the embodiment of the device shown in Figure 1, the cylinder 30 is adapted to be closed at its ends with the heads 32 and 34, suitable grooves 36 and 38 containing packing or a gasket being provided in said grooves for receiving the cylinder and forming a fluid-tight arrangement. The head 32 is provided with a stud 40 adapted to be received in the enlarged aperture 42 of a bracket 44, or the like, rubberized members or blocks 46 being disposed between the head and bracket and between the bracket and retaining plate 48 for forming a substantially cushioned universal joint, the stud being provided with securing means in the form of the nut 50 for effecting proper connection. The heads 32 and 34 are provided with outwardly extending flanges or lugs 52 and 54 having aligned apertures for receiving the securing bolts 56 serving to retain the heads and cylinder wall in cooperative assembly.

The head 34 is provided with a stuffing box 58 through which the piston 60 extends, the stuffing box consisting essentially of the member 62 welded as at 64 to the head and having threaded engagement with the adjusting member 66, said member being adapted to have adjustable relation with the collar 68 and packing 70. The piston rod 60 is threaded as at 72 for receiving the nuts 74 and 76 engaging the washers 78 between which and the bracket 80 the rubberized blocks 82 are provided, the piston rod extending through the enlarged aperture 84 provided in said bracket whereby a substantially universal rubberized joint is formed. The piston rod is provided with the central groove or channel 86 adapted to have communication at one end with the flexible tube 88 which extends to the compressor or air line and serves to conduct compressed air to the piston rod. The opposite end of the channel is closed by means of the plug 90 and is threaded as at 92 for engagement with the piston member 94 and a spaced piston member 96.

Oppositely facing leathers 98 are secured to the plates by means of the bolts 100 and are spaced apart by a spacer ring 102 provided with suitable apertures or channels 104, said apertures communicating with the chamber 106 formed by the spaced piston plates, the said chamber communicating with the channel 86 by means of channels 107. The plates may be further secured in fixed position by means of the nut 108 threaded on said piston rod. A by-pass valve 110 is provided through and cooperating with the piston plates being shouldered as at 112 for cooperative relation with the plate 94, and threaded as at 114 for cooperative engagement with the plate 96. The valve member 116 is spring pressed as at 118 to seat toward the end of the cylinder through which the piston rod extends, the apertured fitting 120 being provided for adjusting the spring and permitting passage through the valve to the lower part of the cylinder. A valve 122 of similar character is disposed in the piston plate 94, but seating toward the end of the cylinder remote from the piston rod and forming a communication between said end of the cylinder and the hollow piston.

The device shown in Figure 2 is substantially the same, the piston rod and bracket connections being as described with respect to Figure 1. In this case, however, the cylinder 124 has threaded engagement as at 126 and 128 with the ends of the cylinder 130 and 132, the stuffing box 58 being substantially the same as has already been described, the member 134 integral with the head 132 replacing the separate member 62. In this case the valve 122 is put in the end of the piston rod, replacing the plug 90, and no by-pass is provided through the piston. Instead of the by-pass 110, a valve housing 136 is tapped into and has communication as at 138 with the end of the cylinder through which the piston rod extends. The valve 140, spring pressed as at 142, is adapted to be seated toward the cylinder, that is, opens outwardly from the cylinder, the spring being adjusted by means of the plug 144, the guard cap 146 being provided for preventing unauthorized operation of the plug. The by-pass 148 is secured as at 150 to have communication with the valve member 136 and extends to and is connected as at 152 to the fitting 154 tapped into the head 130 and having communication with the end of the cylinder remote from the piston rod.

In operation of the devices illustrated in Figures 1 and 2, compressed air, say, from a brake or train line, is supplied through the flexible hose 88 and to each side of the piston, the leathers 98 acting as valves permitting passage of air from the hollow piston to the ends of the cylinder. The piston is normally centered with respect to the cylinder, and upon relative movement between the piston and cylinder, say, the piston moving downwardly, no air can pass the lower leather on account of the disposition thereof, said leather forming an effective seal. After a predetermined pressure has been built up, the valve 122 will operate to bleed some of the air back into the hollow piston rod, thereby preventing loss of compressed air from the entire system. Downward movement, of course, will tend to cause reduction of pressure in the piston rod side of the cylinder, but the upper leather will function as a valve to permit air to be supplied thereto. Upon movement of the piston upwardly, air will be supplied from the piston past the lower leather into the lower part of the cylinder, and after a predetermined pressure has been built up above the piston or on the piston rod side, the valve 116 will open, causing the compressed air to be by-passed whereby a higher pressure than train line pressure will be built up below the piston, that is, there will be a pre-loading so that the downward movement of the piston rod will be effectively resisted and there will not be a jerky operation or lost motion for a part of the stroke of the piston.

The device shown in Figure 2 operates similarly, with the exception that upward movement of the piston operates to open the valve 140 whereby the air will be by-passed to the member 148 of the piston, the operation of the other parts of the structure being the same.

In the device shown in Figure 3, the L- or cup-shaped leathers are replaced by metallic rings 156 held by the upper and lower piston members 158 and 160 and the retainer ring 162 which is not apertured. The chamber 164 is provided in the piston communicating with the channel 86 through channels 107. In this case valves 166 and 168 are provided in the piston members 158 and 160, said valves seating inwardly and caged by suitable pins 170.

In the operation of this device, movement of the piston rod downwardly causes the valve 122 to open after predetermined pressure has been built up to return the air below the piston to the piston chamber 164, the valve 166 opening to supply the compressed air to the reduced pressure portion above the piston. Movement in an opposite direction causes the valve 168 to function in a similar manner and it is to be understood that a by-pass comparable to that shown in Figure 1 or in Figure 2 is provided acting in the manner described for those figures.

In the application of the shock absorbing devices or any devices to a truck frame such as shown in Figure 4, the devices are adapted to be applied in an inverted position, that is, with the piston rod extending upwardly, and it is desirable to apply the devices between a side frame member and the equalizer. In the truck shown in Figure 4, the wheel and axle assemblies 172 are disposed in suitable journal boxes (not shown) having cooperative engagement with the pedestals 174. An equalizer 176 extending below the truck side frame 178 and spaced therefrom is provided with upwardly extending arms 180 having cooperative engagement with the journal boxes which are adapted to be movable in the jaws 174. The car body (not shown) is supported on a main bearing carried by a suitable bolster having cooperative relation with the soft elliptic spring assemblies 182. For taking the hard shocks relatively stiff or hard coil springs 184 are provided extending between the side frame member 178 and the equalizer 176. The springs, at their upper ends, are seated in suitable recesses 186 disposed in spring caps 188. The spring caps are adapted to be positioned on the side frame by positioning ribs 190 and 192 adapted to embrace portions of the side frame member 178, the ribs being provided with reinforcing ribs 194 and 196. The body portion of the cap is provided with an integral outwardly extending arm 198 provided with the notch 200 adapted to replace the bracket 80 and receive the rubberized members 82 and fastening means 76—74 of the piston rod 60, it being understood that the construction within the cylinder 30 is substantially the same as that described for the shock absorbing devices per se described herein.

The lower spring cap 202 is substantially the same, being provided with the spring seat portion 204 adapted to receive the lower portion of the coil spring 184, and is provided with spaced ribs 206—208 adapted to embrace the equalizer reinforcing members 210 also provided. The spring cap members are also provided with the integral arm provided with the aperture 214 for receiving the stud 40 and the associated blocks and securing means 50. Apertured arms 216 are provided at convenient places and are adapted to be aligned with suitable eyes on the bracket members 218 for accommodating the securing means 220. Each of the piston rods is provided with the flexible members 88 extending to a suitable reservoir, or the brake or air line, in order that a pressure considerably above atmospheric is initially set up in the shock absorbing devices, as already described.

In busses or small automobile work, it may be desirable to provide an air reservoir which is adapted to be supplied with compressed air from a source external of the vehicle. In this case the shock absorber storage tank 222 is provided with the valve fitting 224 for introducing compressed air into the chamber 222, and, in the case that a header 226, spring pressed as at 228, is to be used, an additional fitting will be provided at 230 in which case fitting 224 would not be used until the header were removed. The reservoir 222 will be connected to the flexible tubing 88 (see Figure 9) through the air line 232 in which a reducing valve 234 is provided whereby the flexible tubing and consequently the shock absorbing devices will only be supplied with air at a predetermined pressure, that is, if they are to be supplied with air at 90 pounds, the valve 234 will only operate to pass compressed air from the tank 222 when the air pressure on the shock absorbing side of the valve 232 drops below 90 pounds.

In the case where it is desirable to utilize a shock absorber storage tank in conjunction with a compressor or storage tank for the brake system, an assembly such as illustrated in Figure 10, is to be contemplated. In this case the shock absorber storage tank 236 is connected through the air line 238 to the storage tank 240 for the brake system. A valve 242 will be provided which is adapted to be closed at seat 244, the valve being provided with an enlarged head 246 spring pressed at 248, toward closed position, the pressure of the spring being regulated by the adjustment 250. It will, of course, be understood that the shock absorbers may be connected through a suitable reducing valve, as illustrated in Figure 9. With a connection of this sort, when the air in the brake system reaches a certain amount, the pressure on the bottom of the head 246 will open the valve permitting the shock absorber storage tank to be supplied with compressed air, and the valve will be maintained open for so long as the proper or sufficient pressure is present in the brake system. However, should the brake system air, due to some defect in the compressor, or leakage, drop below a safe amount, which will be in excess of that necessary to safely operate the brakes, the pressure will be reduced on the valve member 246 sufficiently to permit the spring 248 to close the valve wherein no more compressed air will be supplied to the shock absorber storage tanks. The shock absorbers will then operate on existing prepressure, which will, of course, operate the shock absorbers for a considerable length of time due to the fact that no air is exhausted from the system.

The devices shown in Figures 11 to 14, inclusive, contemplate the same bracket connections as those described for Figures 1 and 2, the difference being that these shock absorbers are designed for use with a solid piston rod. In these cases the heads 250 and 252 are recessed as at 254 for the reception of the cylinders 256, the assembly being maintained in operative position by means of the bolts 258 disposed through suitable ears or flanges 260. The cylinders are provided with a channel 262 provided with the fittings 264 to which the flexible tubing 88, (not shown), is adapted to be secured for supplying air above atmospheric pressure to each side of the piston. Valves 266 and 268 are provided communicating with the channel 262, said valves being provided with the valve member 270 adapted to seat toward the channel 262 so that pressure in excess of that supplied to the channel 262 through the fitting 264 produced by compressing the air in the cylinders serves to close the valve members 270, said members being normally urged toward closed position by means of the springs 272.

In the case of Figure 11, the piston 274 is provided with the piston rod 276 extending through a suitable stuffing box 278 provided in the head 252 and said piston 274 is provided with by-pass valves 280 and 282 provided with the valve members 284, spring-pressed as at 286, toward opposite ends of the cylinder.

In Figure 13 the piston 288 is provided with the piston rod 276 extending through the stuffing box 278 and in each case the pistons are provided with suitable piston rings 290. The cylinder walls in the modification illustrated in Figure 13 are provided with grooves 292 and 294, said grooves being spaced by means of the central shoulder 296 whereby, when the piston is in normal centered position, the air pressure will not leak from one side of said piston to the other and the grooves will not operate to by-pass the compressed air from one side of the piston to the other when the piston is moving until after the piston has moved a predetermined amount. It will thus be seen that in operation, the device is substantially the same, as movement of the piston, say, upwardly, serves to close the valve 266, and after a predetermined movement of the piston, the compressed air above the piston will be by-passed through the valves 280 or the grooves 292. The air of reduced pressure below the piston will be replenished through the valve 268. In movement in the opposite direction, air will be by-passed through the valves 282 or the channels 294, the air of reduced pressure being replenished through the valves 266 above the piston. After the air below the piston has been compressed a predetermined amount, the valve 298 in the head 252 will open to permit a certain amount of the compressed air to escape.

Referring now to the structure shown in Figure 15, the piston 300 is of the hollow type provided with the piston rings 302, said piston rings having cooperative sliding engagement with the cylinder 304. The piston is provided with a hollow piston rod 306, the channel 308 thereof being in communication with the chamber 310 formed in the hollow piston through the channels 312, the piston end of the channel 308 being closed by the plug 314. After a predetermined movement of the piston in either direction, the air is by-passed from one side of the piston to the other by means of the adjustable valves 316 and 318 opening downwardly and upwardly respectively. The piston is provided with valves 320 and 322 opening upwardly and downwardly respectively and forming communication from the ends of the cylinder to the hollow piston. For example, when the piston moves upwardly, air will be permitted to be supplied below the piston through the valve 322, and after a predetermined movement, air will be by-passed to the lower side of the piston through the valve 316, and operation in a reverse direction causes operation of the valves 320 and 318 in a like manner. As in Figures 1 and 2, the channel 308 communicated with a flexible hose similar to 88 whereby compressed air from a brake or train line is supplied into chamber 310 and through either of the valves 320 or 322 into the chamber 304 on either side of the piston depending, of course, upon the movement of the piston so that there will be a pre-loading to resist movement of the piston and to eliminate jerky operation or lost motion for a part of the stroke of the piston, all as explained previously in the specification in respect to the embodiment in Figures 1 and 2 of the drawings.

In the construction shown in Figure 16, a similar fastening means may be provided to a suitable bracket as has already been described for Figures 1 and 2. In this case, the stud 324 is hollow providing the channel 326 adapted to receive air at an increased pressure through the fitting portion 328 and a suitable hose connection. The channel 326 is in communication with the channel 330 in the sleeve 332, the sleeve extending downwardly and into the partial channel 334 formed in the piston rod 336 secured to the piston 338. The sleeve 332 is apertured as at 340 to supply compressed air above the piston and is provided with the elongated aperture or slot 342 adapted to have cooperative engagement with the aperture 344 provided in the piston rod for supplying compressed air below the piston, the piston extending downwardly through a suitable stuffing box 346 and thence outwardly of the cylinder 348. The piston is provided with suitable piston rings 350 and by-pass valves 352 and 354 opening downwardly and upwardly, respectively.

When the piston travels upwardly, a small amount of air will be bled through the aperture 340 and through the aperture 344. After a predetermined movement of the piston the valve 352 will serve to by-pass the compressed air below the piston. In movement in the opposite direction the air below the piston will be compressed, a small amount being bled through the aperture 344 to the upper part of the piston until after a predetermined movement has been effected, at which time the increased pressure will be by-passed through the valve 354. After a further increased movement, the piston will be prevented from "bumping" by a small amount of air being bled outwardly through the valve 356.

In automobile work, when the brakes are applied, especially suddenly, the springs which in the present day cars are long and soft, tend to assume a compound curve. In other words, axle roll occurs. This would tend to tip the axle and so injure or disrupt the driving and steering connections. In order to prevent this roll, a shock absorber, such as described in this application, is used in conjunction with a fitting, to be described, at both top and bottom, said fitting being shown for the bottom connection, as in Figures 18 and 19, the small leaf spring indicating the direction in which the device is applied.

In this case, the bracket 360 is secured to the axle or the spring and is provided with the enlarged aperture 362 through which the piston rod 364 extends. The piston rod is provided with spaced securing means shown in the form of nuts 366 and 368 seated on the plates 370 which are of rigid construction, the plates seating on the rubber blocks 372. The rubber blocks, shown as of circular plan, are provided with a raised ridge 372 extending transversely of the rubber block, the upper surface or contour of the block being of compound curved shape extending downwardly to an appreciably smaller ridge 374 on each end of the block. When the brake is applied then, and the spring tends to buckle or assume a compound curve shape, the depressed portion 376 of the rigid plate following the contour of the rubberized block makes the rubber of decreased cross-section go solid quicker, and thus prevents axle roll, maintaining the spring in a symmetrical simple curve. Side roll of the car body is permitted, due to the fact that side pressure is transmitted as at 378 on a ridge of constant depth and not on a depressed portion.

Instead of a rubberized connection, a metallic connection may be made, such as shown in Figure 17, in which case the stud 40 is provided with the nut 50 between which nut and the bracket 44, and between the bracket and the head 130, there are disposed flexible metallic plates 380 which extend from the stud in an outward direction toward the bracket, shoulders 382 being provided adapted to seat on the nut and head. Similar members 380 are provided at the opposite end between nuts 74 and 76 and the bracket 80.

Figures 21 and 22 illustrate the application of the device to an airplane strut. In this case the strut 384 is provided with a cross-head 386 to which shock absorbing devices 388 are provided, a suitable connection 390 being effected between the cross-head or yoke 386 and the head 392 of the shoulder 394. The piston contained in the shoulder may be of the type having a by-pass therethrough provided with a hollow piston head and hollow piston rod 396 opening downwardly and being secured to the cross-head or yoke 398. Said cross-head or yoke is suitably secured to the strut member 400 secured to the landing gear 402. A dummy cylinder 404 is provided having a piston rod 406 extending therein and provided with a disk 408, suitable coil springs 410 being provided above and below said disk for maintaining the disk in centralized position whereby the pistons of the shock absorbing devices 388 will be maintained in normal central position. Of course, the units may be stream lined in a suitable casing, not shown, and operation thereof will be as described with respect to the different modifications, it being seen that when the airplane leaves the ground, the springs 410 will function to maintain the pistons in substantially central position so that in landing the shock absorber will be in proper position to operate.

In the embodiment of the device illustrated in Figure 23, the strut 412 is provided with the spring casing 414 having a disk 416 substantially centering in the casing and provided with springs 418 disposed on either side thereof for normally centering the disk. Said disk is connected to the hollow piston rod 420 extending through a plurality of cylinders 422, shown three in number, disposed in substantial alignment and connected by suitable sleeves 424. The piston 420 extends downwardly and is suitably connected to the landing gear. The piston rods are provided with the pistons 426 of any construction, such as shown in any of the modifications, and operate in a manner as described, the springs serving to maintain the pistons in centered position after the plane has left the ground so as to be in a suitable position to effectively operate upon landing.

In the modification illustrated in Figure 20, the cylinder 428 is provided with the heads 430 and 432 shown threaded thereto and suitable securing means is provided on the stud 434 on the hollow piston rod 436, as has already been described. The piston rod 436 extends through a suitable stuffing box 438 provided in the head 432, said rod being suitably channeled as at 440, closed at the piston end with the plug 432, and suitably threaded as at 444 to the spaced plates 446—448 forming the hollow piston head and communicating therewith through channels 449, said head being assembled by means of the bolts 450 extending through the oppositely facing cup leathers 452 and 454 and the apertured spaced rings 456. The adjustable valve by-pass 458 is provided with the ball valve 460 seating upwardly and urged into such position by means of the spring 462, said spring being adjusted, as at 464, by the apertured collar or nut. An adjustable valve member 466 may also be provided seating downwardly whereby, when the piston moves downwardly after a predetermined amount of air will be by-passed through the valve 466 into the hollow piston head where it may be re-supplied through the spacing rings and leathers 454 to the upper part of the piston. Movement in an opposite direction, of course, will by-pass air after a predetermined movement of the piston through the valve 458 to a lower portion of the piston.

From the above it will be appreciated that effective and simple constructions are provided for various purposes, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:—

1. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having means for permitting supply of fluid from said piston to the side of said cylinder from which said piston is moving.

2. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having one way valves communicating therewith and with the adjacent end of said cylinder for permitting supply of fluid from said piston to the side of said cylinder from which said piston is moving.

3. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and outlet means for one end of said cylinder to said piston.

4. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and outlet means from one end of said cylinder to said piston rod.

5. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and a valve carried by said piston operable to exhaust compressed fluid from the end of the cylinder remote from said first named end after a predetermined movement of said piston.

6. In a shock absorbing system, the combination of a source of compressed fluid supply, a cylinder, a hollow piston disposed therein, a hollow piston rod secured to said piston and communicating therewith, said rod being connected to said source and supplied with compressed fluid therefrom, said piston rod extending outwardly of one end of said cylinder, a by-pass for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, whereby a closed system is provided, said piston having means for permitting supply of fluid from said piston to the side of said cylinder from which said piston is moving.

7. In a shock absorber, the combination of a cylinder, a hollow piston disposed therein, a hollow piston rod secured to said piston and communicating therewith, said piston rod extending outwardly of one end of said cylinder, a by-pass in said piston for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having means for permitting supply of fluid from said piston to the side of said cylinder from which said piston is moving.

8. In a shock absorber, the combination of a cylinder, a hollow piston disposed therein, a hollow piston rod secured to said piston and communicating therewith, said piston rod extending outwardly of one end of said cylinder, a by-pass connected to said cylinder conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having means for permitting supply of fluid from said piston to the side of said cylinder from which said piston is moving.

9. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having a one way valve communicating therewith and with the adjacent end of said cylinder for permitting supply of fluid from said piston to the adjacent side of said cylinder.

10. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having a one way valve communicating therewith and with the piston rod side of said cylinder for permitting supply of fluid from said piston to last named side of said cylinder.

11. In a shock absorber, the combination of a cylinder, a hollow piston disposed therein, a hollow piston rod secured to said piston and communicating therewith, said piston rod extending outwardly of one end of said cylinder, a by-pass for conducting compressed fluid from the end of said cylinder through which said rod extends to the other side upon movement of said piston toward the first named end of said cylinder, and means in said piston for conducting compressed fluid into said hollow piston upon movement of said piston in an opposite direction from that first named, said piston having a one way valve communicating therewith and with the side of said cylinder remote from said rod, for permitting supply of fluid from said piston to last named side of said cylinder.

12. In a shock absorber, the combination of a cylinder, a hollow piston disposed therein, a hollow piston rod secured to said piston and communicating therewith, a valve for by-passing fluid from the piston rod side of said piston to the opposite side upon a predetermined movement toward said piston rod side, and a valve in said piston for establishing communication with said piston upon movement of said piston away from said piston rod side.

13. In a shock absorber, the combination of a cylinder, a hollow piston disposed therein, a hollow piston rod secured to said piston and communicating therewith, a valve for by-passing fluid from the piston rod side of said piston to the opposite side upon a predetermined movement toward said piston rod side, and a valve in said piston for establishing communication with said piston upon movement of said piston away from said piston rod side, and means for supplying fluid from said piston to the side of said cylinder from which said piston is traveling.

ROLLIN H. MOULTON.